US009762735B1

United States Patent
Webster et al.

(10) Patent No.: US 9,762,735 B1
(45) Date of Patent: *Sep. 12, 2017

(54) SYSTEMS, METHODS, AND COMPUTER-READABLE MEDIA FOR EXPEDITED ACCESS TO CONFERENCE CALLS

(71) Applicant: West Corporation, Omaha, NE (US)

(72) Inventors: Craig A. Webster, Omaha, NE (US); Kevin Pauba, Omaha, NE (US); Myron P. Sojka, Logan, IA (US); Michael T. Mateer, Omaha, NE (US); Melissa A. DeLong, Council Bluffs, IA (US); Jonathan P McIntosh, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,190

(22) Filed: Sep. 29, 2015

Related U.S. Application Data

(63) Continuation of application No. 14/585,612, filed on Dec. 30, 2014, now Pat. No. 9,148,517, which is a continuation of application No. 14/205,474, filed on Mar. 12, 2014, now Pat. No. 8,929,530, which is a continuation of application No. 12/241,140, filed on Sep. 30, 2008, now Pat. No. 8,731,168, which is a continuation of application No. 10/812,854, filed on Mar. 29, 2004, now Pat. No. 7,474,634.

(60) Provisional application No. 60/552,469, filed on Mar. 12, 2004.

(51) Int. Cl.
*H04W 4/06* (2009.01)
*H04M 3/56* (2006.01)

(52) U.S. Cl.
CPC ............ *H04M 3/563* (2013.01); *H04W 4/06* (2013.01)

(58) Field of Classification Search
CPC .......... H04M 3/56; H04M 3/563; H04W 4/06
See application file for complete search history.

(56) References Cited

U.S. PATENT DOCUMENTS

| | | |
|---|---|---|
| 4,635,251 A | 1/1987 | Stanley et al. |
| 5,027,387 A | 6/1991 | Moll |
| 5,483,587 A | 1/1996 | Hogan et al. |
| 5,504,808 A | 4/1996 | Hamrick, Jr. |
| 5,559,875 A | 9/1996 | Bieselin et al. |
| 5,598,536 A | 1/1997 | Slaughter et al. |
| 5,631,904 A | 5/1997 | Fitser et al. |
| 5,719,928 A | 2/1998 | Pinnell et al. |
| 5,812,653 A | 9/1998 | Jodoin et al. |

(Continued)

*Primary Examiner* — Sonia Gay
(74) *Attorney, Agent, or Firm* — Raffi Gostanian

(57) ABSTRACT

Methods, systems, and computer-readable media for admitting conferees into a conference call. Methods to achieve the foregoing can comprise: transmitting an admission request from a user of a communications device to a server for admission to a conference call, the admission request including a unique identifier; storing data unique to the communications device in a data store; relaying the unique identifier from the server to the data store; comparing the unique identifier with the data unique to the communications device; and, when the unique identifier and the previously stored data match, connecting the user directly to the conference call which includes bypassing entry of at least one conference pass code by the user.

20 Claims, 8 Drawing Sheets

(56) References Cited

U.S. PATENT DOCUMENTS

| | | | |
|---|---|---|---|
| 5,825,858 A | 10/1998 | Shaffer et al. | |
| 5,861,907 A | 1/1999 | Wada | |
| 5,883,964 A | 3/1999 | Alleman | |
| 5,884,284 A | 3/1999 | Peters et al. | |
| 5,987,112 A | 11/1999 | Chakravarti et al. | |
| 6,035,027 A | 3/2000 | Alleman | |
| 6,144,667 A | 11/2000 | Doshi et al. | |
| 6,212,268 B1 | 4/2001 | Nielsen | |
| 6,236,644 B1 | 5/2001 | Shuman et al. | |
| 6,253,249 B1 | 6/2001 | Belzile | |
| 6,307,928 B1 | 10/2001 | Yamasaki | |
| 6,330,320 B1 * | 12/2001 | Cornell | H04M 3/56 379/202.01 |
| 6,421,324 B1 * | 7/2002 | Boyle | H04M 3/56 370/261 |
| 6,453,034 B1 | 9/2002 | Donovan et al. | |
| 6,463,038 B1 | 10/2002 | Wilson | |
| 6,466,252 B1 | 10/2002 | Miyazaki | |
| 6,493,443 B1 | 12/2002 | Furman et al. | |
| 6,512,764 B1 | 1/2003 | Carew et al. | |
| 6,549,229 B1 | 4/2003 | Kirby et al. | |
| 6,594,257 B1 | 7/2003 | Doshi et al. | |
| 6,668,048 B1 | 12/2003 | Suga et al. | |
| 6,693,661 B1 | 2/2004 | Vanderwilt et al. | |
| 6,714,635 B1 * | 3/2004 | Adams | H04M 3/4931 379/204.01 |
| 6,754,322 B1 * | 6/2004 | Bushnell | H04M 3/56 379/158 |
| 6,885,740 B2 * | 4/2005 | Ernstrom | H04M 3/54 379/202.01 |
| 6,898,273 B2 * | 5/2005 | Ernstrom | H04M 3/54 379/202.01 |
| 6,920,212 B2 | 7/2005 | Stern et al. | |
| 7,085,243 B2 * | 8/2006 | Decker | H04L 12/1818 348/E7.084 |
| 7,133,665 B1 | 11/2006 | Peon et al. | |
| 7,298,834 B1 | 11/2007 | Homeier et al. | |
| 7,466,812 B1 | 12/2008 | Mahy et al. | |
| 2002/0091769 A1 * | 7/2002 | Drozdzewicz | H04L 12/1818 709/204 |
| 2002/0122391 A1 | 9/2002 | Shalit | |
| 2003/0026406 A1 * | 2/2003 | Ernstrom | H04M 3/54 379/202.01 |
| 2003/0026407 A1 * | 2/2003 | Ernstrom | H04M 3/54 379/207.02 |
| 2004/0047460 A1 * | 3/2004 | Adams | H04M 3/4931 379/202.01 |
| 2004/0101119 A1 * | 5/2004 | Malcolm | H04M 3/562 379/202.01 |
| 2004/0170266 A1 * | 9/2004 | Adams | H04M 3/4931 379/202.01 |
| 2004/0246332 A1 | 12/2004 | Crouch | |
| 2005/0069114 A1 | 3/2005 | Eran | |

\* cited by examiner

110 ↓

| Host Name | Conference Host Code | Unique Identifier | Conference Participant Code(s) | Access Telephone Number(s) |
|---|---|---|---|---|
| John Smith 221a | 1234 | DNIS=555 1212<br>ANI=402 555 1212<br>MIN=402 555 1213 | 1235 | 444 555 1212 |
| Mary Jones 221b | 9847 | ANI=304 555 1212<br>ANI $^2$=304 555 1214 | 1237 | 444 555 1213 |

SYSTEMS, METHODS, AND COMPUTER-READABLE MEDIA FOR EXPEDITED ACCESS TO CONFERENCE CALLS

CROSS-REFERENCE TO RELATED APPLICATIONS

This application is a continuation of and claims the benefit of the filing date of U.S. patent application Ser. No. 14/585,612, filed on Dec. 30, 2014, which is a continuation of and claims the benefit of the filing date of U.S. patent application Ser. No. 14/205,474, filed on 12 Mar. 2014, now issued U.S. Pat. No. 8,929,530, which is a continuation of and claims the benefit of the filing date of U.S. patent application Ser. No. 12/241,140, filed on 30 Sep. 2008, now issued U.S. Pat. No. 8,731,168, which is a continuation of and claims the benefit of the filing date of U.S. patent application Ser. No. 10/812,854, filed on 29 Mar. 2004, now issued U.S. Pat. No. 7,474,634, which, in turn, claims the benefit of the filing date of U.S. provisional patent application Ser. No. 60/552,469, filed on 12 Mar. 2004 to the fullest extent permitted under 35 U.S.C. §119(e), and the contents of such patent applications are incorporated by this reference as if set forth verbatim herein.

BACKGROUND OF THE INVENTION

The present invention relates to conference calling, and more particularly to methods, systems, and computer-readable media for admitting conferees into a conference call.

In the related art, conference call hosts access a conference call by dialing an access telephone number, and thereafter entering or otherwise providing one or more predefined codes to access the conference call. This related art processing imposes several burdens on the conference call host. Particularly, the host must memorize these codes, in addition to the access numbers, or must keep a card or other item bearing these codes readily accessible when requesting a conference call. Further, when the conference call host is driving, traveling, or otherwise occupied with some other task, the conference call host may wish to eliminate as many steps as possible when accessing a conference call.

SUMMARY OF THE INVENTION

The present invention, in exemplary embodiments, overcomes the above disadvantages and other disadvantages not described above. Also, the present invention is not required to overcome the disadvantages described above, and an exemplary embodiment of the present invention may not overcome any of the problems described above.

Thus, in one aspect, the present invention is directed to a system for conference calling. The system may comprise a communications device operable by a user to transmit an admission request for admission to a conference call, where the admission request may include a unique identifier. Also included may be a data store including previously stored data unique to the communications device, and a server operable to receive the admission request from the communications device, to relay the unique identifier to the data store for comparison with the previously stored data, and, when the unique identifier and the previously stored data match, to connect the user directly to the conference call which includes bypassing entry of at least one conference pass code by the user.

In another aspect, the present invention is directed to a method for conference calling. The method may comprise: transmitting an admission request from a user of a communications device to a server for admission to a conference call, the admission request including a unique identifier; storing data unique to the communications device in a data store; relaying the unique identifier from the server to the data store; comparing the unique identifier with the data unique to the communications device; and when the unique identifier and the previously stored data match, connecting the user directly to the conference call which includes bypassing entry of at least one conference pass code by the user.

A further aspect of the invention includes a computer readable medium for conference calling, the computer readable medium having computer-executable instructions for execution by a processing system, the computer-executable instructions for performing steps associated with exemplary methods of the invention.

BRIEF DESCRIPTIONS OF THE DRAWINGS

FIG. 2 is a diagram of a data structure suitable for supporting the enrollment process and/or an admission process as taught herein.

DETAILED DESCRIPTION OF ILLUSTRATIVE EMBODIMENTS

Enrollment of Conference Host(s)

The instant invention provides enrollment and admission processes and apparatus to support expedited or direct entry of conference call hosts (designated generally by the reference sign 100 in FIGS. 1, 4, and 5, and by 700 in FIG. 7) into conference calls. As noted above, in the related art, conference call hosts access a conference call by dialing an access telephone number, and thereafter entering or otherwise providing one or more predefined codes to access the conference call. This type of processing imposes several burdens on the conference call host. Particularly, the host 100 must memorize these codes, in addition to the access numbers, or must keep a card or other item bearing these codes readily accessible when requesting a conference call.

Further, when the conference call host 100 is driving, traveling, or otherwise occupied with some other task, the conference call host 100 may wish to eliminate as many steps as possible when accessing a conference call. The instant invention provides various systems and methods to achieve these and other objectives.

Figure 1:
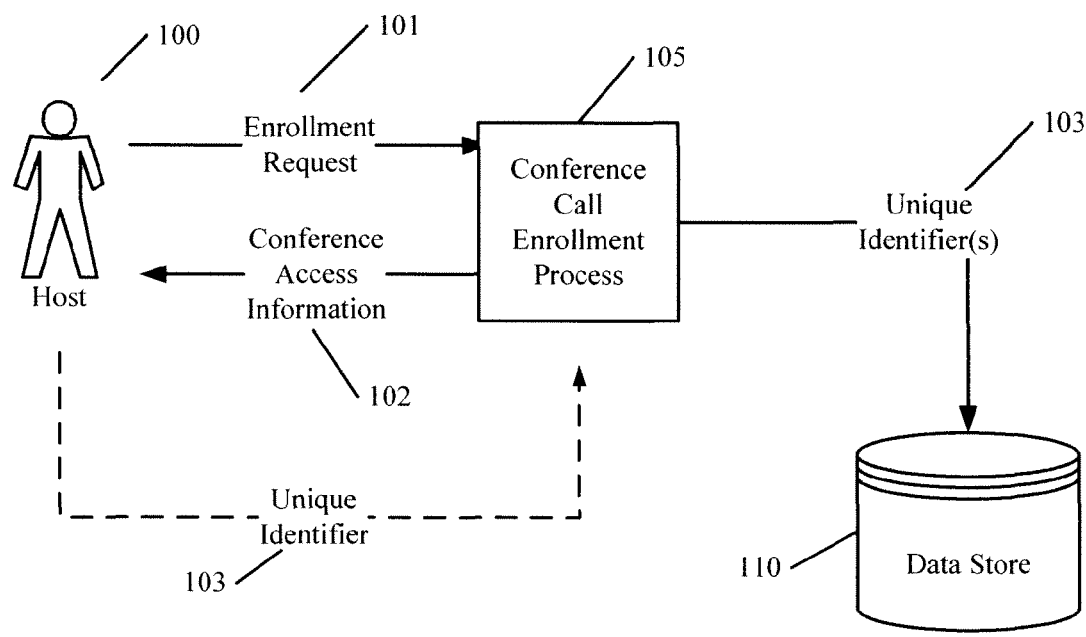
FIG. 1 is a block diagram illustrating components and data flows of an enrollment process by which conference hosts can enroll in conferencing services according to the instant invention.
Figure 3:
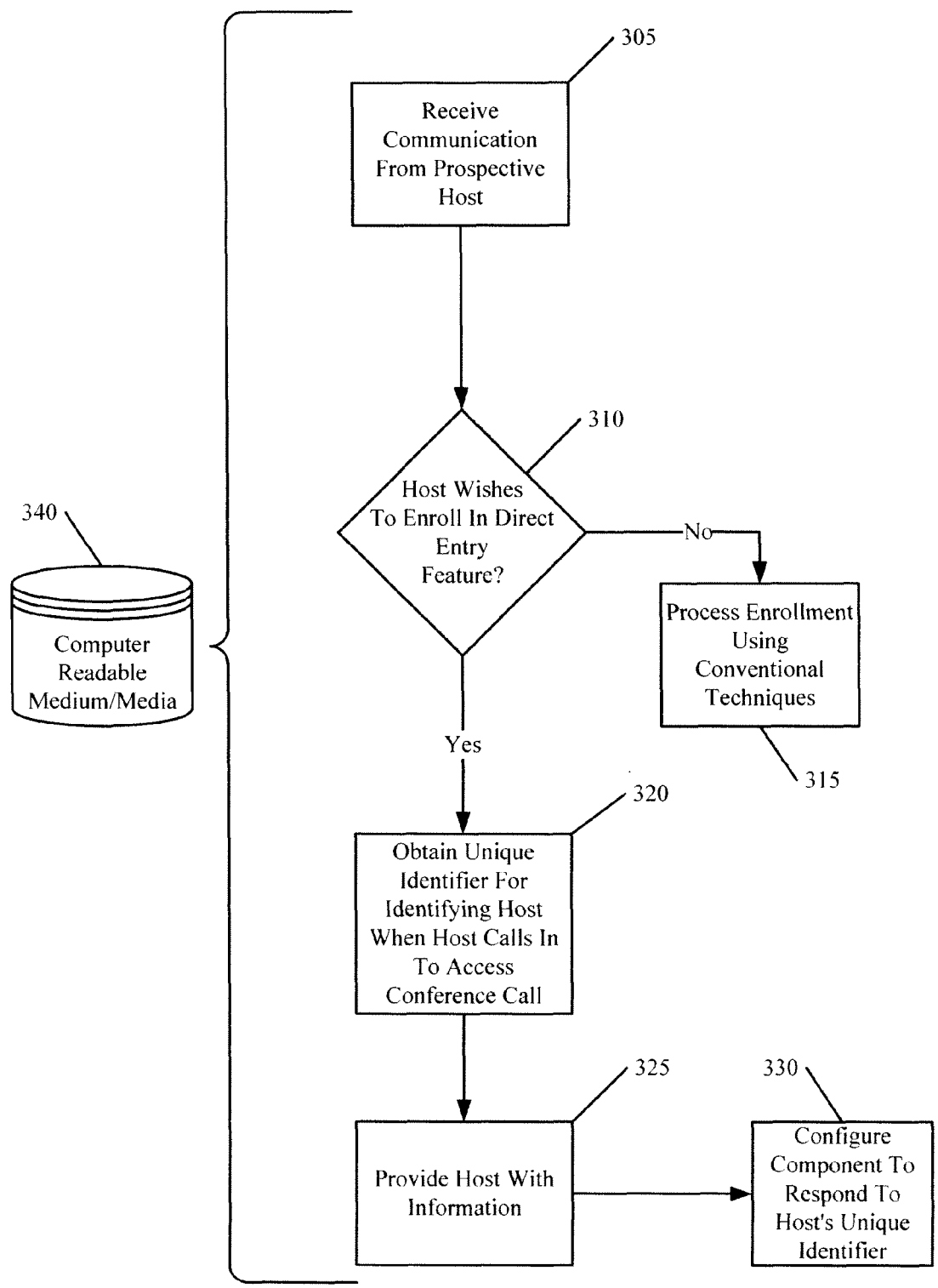
FIG. 3 is a flowchart illustrating process flow associated with the enrollment process discussed above in connection with FIGS. 1-3.

Various embodiments of the invention that enable prospective conference call hosts 100 to enroll for conferencing services with expedited entry to conference calls will be discussed with reference to FIGS. 1-3 provided below.

Turning to FIG. 1, a conference call enrollment process 105 receives a request 101 from a prospective conference call host 100 to subscribe to, enroll in, or register for conferencing services, and can (in some embodiments of the invention) receive from the conference call host 100 a unique identifier 103 associated with the conference call host 100. This unique identifier 103 can relate to one or more devices or other means from which the conference call host 100 may originate one or more future requests for admission to particular conference calls. The dashed line appearing in FIG. 1 indicates that the unique identifier 103 may, but need not necessarily, flow from the host 100 to the conference call enrollment process 105. Alternatively, the conference call enrollment process 105 could generate and/or assign a unique identifier 103 to the host 100, which identifier 103 can be used by the conference call host 100 to request conferencing services or a conference call, irrespective of the particular device used by the conference call host 100. In this latter case, the unique identifier 103 could be a unique telephone number assigned only to the conference call host 100, which number the conference call host 100 would dial to access conferencing services. This aspect of the invention is discussed in more detail below in connection with the conference access information 102.

The unique identifier 103, in whichever form discussed above, is forwarded for storage in the data store 110. The conference call enrollment process 105 also provides to the conference call host 100 access information 102 that the given conference call host 100 can use to request a conference call after enrollment. In some embodiments of the instant invention, the access information 102 may serve, at least in part, as the unique identifier 103 when the conference call host 100 requests admission to the conference call.

In still other embodiments of the instant invention, the access information 102 could take the form of a telephone number shared among a plurality of hosts 100, at least some of whom share a characteristic, such as having enrolled in conferencing services according to the instant invention. In these embodiments, the unique identifier 103 could take a form other than the telephone number dialed by the host 100.

The conference call enrollment process 105 then configures one or more components of a system that supports connecting the conference call host 100 directly to the conference call in response to recognition of the unique identifier and/or the access information assigned to the conference call host 100. Various illustrative examples of these components are discussed in detail below.

Discussing each one of the above functions in more detail in connection with FIG. 3, the method can receive one or more requests 101 from the conference call host 100 to enroll in conferencing services, which can be provided on a pre-paid billed, or other basis. For example, a given host 100 may hold multiple conferencing accounts, with various ones of these accounts being either pre-paid or billed. One or more of these accounts can be adapted to support the direct or expedited admission feature as discussed herein. Further, the conference call host 100 could selectively enable or disable the expedited entry feature of the present invention after completing the enrollment process taught herein.

A prospective conference call host 100 can contact a conference call enrollment process 105 via telephone, internet, e-mail, or any other known communications means (not shown) as may be known or recognized as appropriate by those skilled in the art (Block 305 in FIG. 3). If the conference call host 100 wishes to enroll in the expedited or direct entry features of the invention, (Block 310 of FIG. 3) the conference call enrollment process 105 can obtain, generate, or capture one or more unique identifiers 103 related to the conference call host 100 (Block 320 of FIG. 3). If the host 100 does not wish to utilize the direct entry features of the invention, the host 100 is enrolled without using the aspects of the present invention (Block 315 in FIG. 3). In more detail, the host 100 may be prompted as to whether he/she wishes to enroll in the expedited or direct entry feature, or the enrollment process 105 can enroll the host 100 in this feature by default, and the host 100 may opt-out (and opt back-in) later if desired.

As a non-limiting example of obtaining the unique identifier 103, if the conference call host 100 uses, e.g., a telephone-based communication to enroll in conferencing services, the enrollment process 105 can capture and store the telephone number of the handset from which the conference call host 100 originated this telephone communication. The known Automatic Number Identification (ANI) service provides, at least in part, an illustrative but non-limiting means for realizing this function. The ANI service is conventional and well known, and in the interests of conciseness is not discussed in further detail herein. The ANI information can provide the telephone number or other identifying indicia associated with a location or a handset (wired or possibly wireless) from which the conference call host 100 originates a communication. Preferably, this telephone number or other identifying indicia is unique to the given host 100. Wireless embodiments of the instant invention may employ known parameters such as a mobile identification number (MIN) associated with a wireless handset, e.g., a cellular telephone or device coupled to communicate using, at least in part, a wireless link to a communications network used by the host 100.

In general, the stored unique identifier 103 can serve as a means for identifying the conference call host 100 when the host 100 requests access to a given conference call. In embodiments wherein the unique identifier 103 is captured automatically from some aspect of the host's 100 communication during enrollment, the host 100 can be prompted to verify the accuracy of the automatically-captured ANI, as well as being prompted to accept or consent to the automatic capture of the unique identifier 103, or to consent to enrollment in the "direct connection" feature taught herein.

However, if the conference call host 100 is calling to subscribe from a telephone other than the one from which he or she will later be originating conference calls, the conference call host 100 can provide one or more other telephone numbers, any one of which may serve as the originating number for conference calls later initiated by the host 100. These other telephone numbers can be entered by the host 100 at the time of enrollment by keypad DTMF input, voice or speech response (via live, human operator or interactive voice response units (IVR/VRU)), or other known data-entry means. Also, these other phone numbers could be acquired by cross-reference to other accounts associated with the host 100. These other telephone numbers could function as the unique identifier 103 in addition to, or instead of, the telephone number automatically captured via ANI during enrollment. In general, the host 100 can provide, and the conference call enrollment process 105 can receive, one or more different unique identifiers 103 corresponding to a plurality of respective handsets (wired or wireless) from which the conference call host 100 may initiate or originate communications to access conferencing services. The conference enrollment process 105 can then store each unique identifier 103 in the data store 110 for future reference to identify incoming conferencing calls originating from or otherwise associated with the given host 100 (Block 330 in FIG. 3).

As part of the registration, subscription, or enrollment process 105, or as part of a separate process, the invention can include providing to the conference call host 100 access information 102 in the form of, e.g., one or more telephone numbers related to requesting conference calls (Block 325 in FIG. 3). The conference call host 100 can then use the access information 102 to request general conferencing services or to request specific conference calls. Given instances of this access information 102 (e.g., telephone numbers) can be assigned to only one conference call host 100, or may be shared by multiple conference call hosts 100. When the conference call admission process 405 (FIG. 4) receives incoming calls, the admission process 405 can identify those calls seeking conferencing services calls by analyzing information (e.g., the number to which these calls are dialed) related to those incoming calls, and identifying those incoming calls that are dialed to a destination related to the access information 102. In those embodiments where given access information 102 is assigned to only one given host 100, the unique identifier 103 can take the same form as this uniquely-assigned access information 102. Thus, in these embodiments, the host 100 may be identified based only on the access information 102 used to place the call.

In the context of dialed telephone call embodiments, the known Dialed Number Information Service (DNIS) provides one illustrative but non-limiting means for identifying the access information 102 used to dial a given call. Thus, this service may be suitable for identifying which incoming callers are seeking to access conferencing services. DNIS is conventional and well known, and in the interests of conciseness is not discussed in further detail herein.

Various aspects of the invention can include configuring one or more components relating to a conference call admission process 405 to recognize incoming calls from the conference call host 100 after the host 100 has enrolled for conferencing services (Block 330 in FIG. 3). More particularly, the invention can include configuring components that are adapted to process the telephone number to which an incoming call is dialed (the "destination number") and/or the telephone number from which the incoming call originated (the "originating number"), as a type of trigger to connect the conference call host 100 directly to a conference call. These components can be configured according to the information captured, generated, or otherwise by the enrollment process 105. Illustrative but non-limiting examples of suitable components can include software, hardware, data stores (e.g., data store 110) supporting hardware or software components, or any combination of the foregoing, that are configured to perform the functions taught herein.

Figure 4:
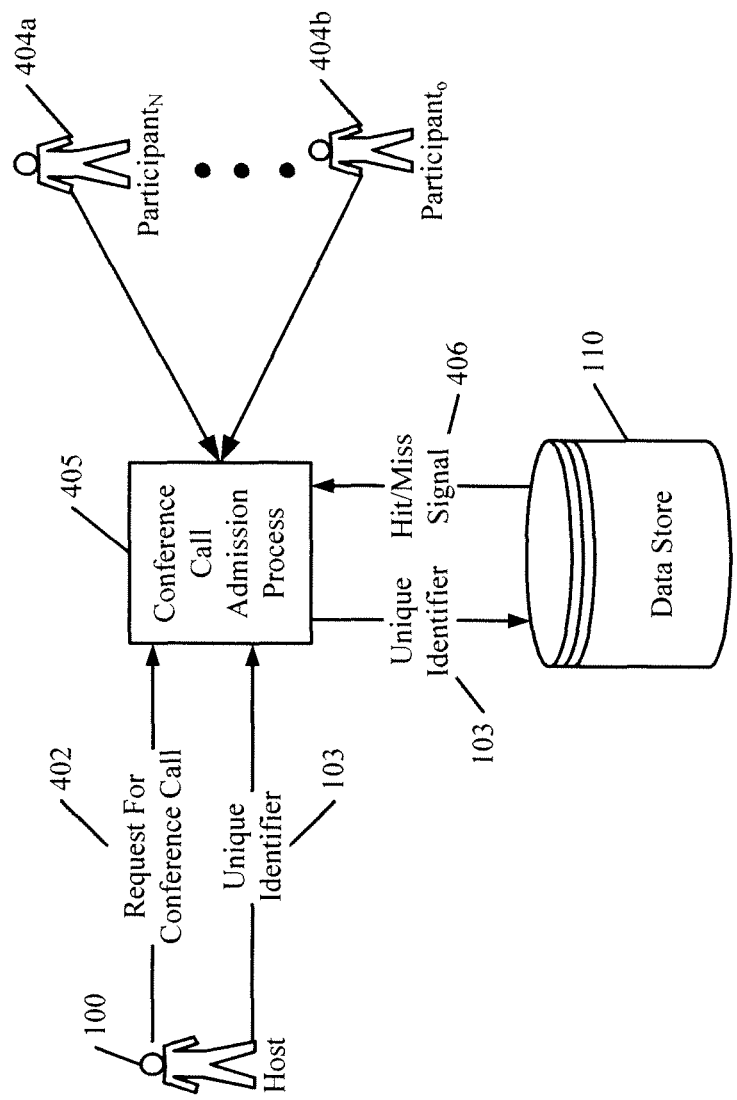
FIG. 4 is a block diagram illustrating components and data flows of a process by which enrolled conference hosts are admitted to conference calls according to the instant invention.
Figure 5:
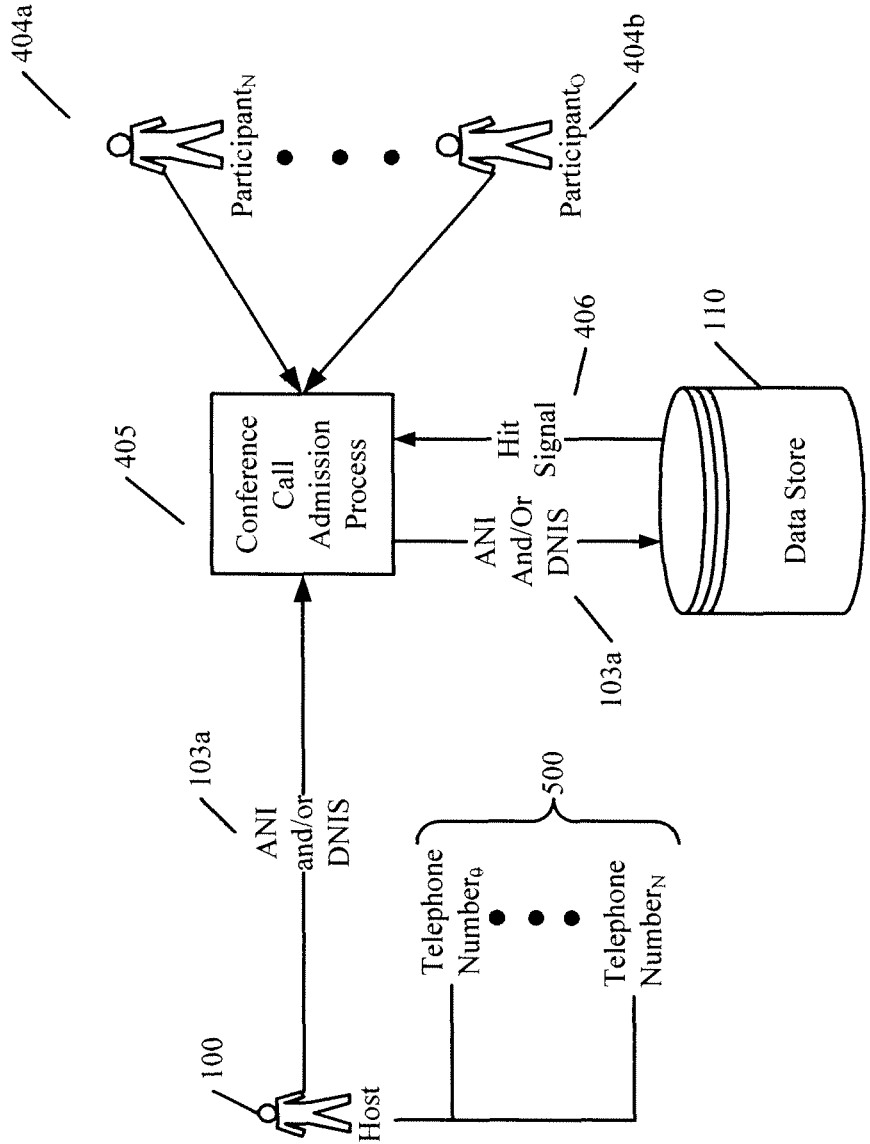
FIG. 5 is a block diagram illustrating in more detail various aspects of the components and data flows shown in FIG. 4.

FIG. 2 is a diagram of a data structure suitable for supporting the enrollment process 105 illustrated in FIG. 1 and the conference call admission process 405 shown in FIGS. 4 and 5. This data structure may be suitable for forming, at least in part, the individual records that comprise the data store 110. More particularly, given records in the data store 110 can be populated with data representing the unique identifier(s) 103 associated with the enrolled conference call host 100 as discussed herein. Illustrative examples of these unique identifiers 103 can include, but are not limited to, data representing a handset, a location, or an originating telephone number(s) from which the conference call host 100 may initiate communications to access conferencing services, and/or a unique destination telephone number assigned to a host 100 by the conference call subscription process. Loading at least these unique identifiers 103 into the data store 110 can support or enable one or more software or hardware components comprising the conference call admission process 405 to process future incoming requests for conference calls. Specifically, as discussed below in connection with FIGS. 3-8, the invention can process a destination number (obtained via e.g., DNIS) and/or an originating number (obtained via e.g., ANI) associated with an incoming telephone call and determine that this telephone call was initiated by a conference call host 100 enrolled in conferencing services according to the instant invention. On at least this basis, the conference call admission process 405 can determine that this host 100 should be directly connected to a conference call as discussed below.

Turning to FIG. 2 in more detail, unique identifiers 103 corresponding to various hosts 100 can be stored in respective entries under the "column" 225. Other information relating to other given hosts 100 can appear in respective "rows", e.g., rows 221*a* or 221*b*. For example, a column 205 can list a name for each given enrolled host 100, a column 210 can list a conference host code (or host passcode) associated with the host 100, and a column 215 can list participant codes (or participant passcode) supported for the host 100. In those embodiments that use a unique destination telephone number to identify the host 100, a column 225 can contain the unique destination telephone number assigned to a given host 100. Otherwise, in embodiments that do not provide the host 100 a unique dial-in number, the column 225 could contain the unique identifier 103 (ANI, MIN, etc.) for identifying an incoming call placed by the host 100, while a column 220 could contain the destination telephone number that the given host 100 dials to access conferencing services. Any of these various data could be populated by the conference call admission process 105.

The process of traversing the data structure in FIG. 2 to admit the conference call host 100 to a given conference call is described in detail below in connection with FIGS. 4-6. Those skilled in the art will understand that the format, layout, and content of the data structure as shown in FIG. 2 is illustrative rather than limiting of the instant invention. Specifically, those skilled in the art will recognize that various changes, modifications, additions, omissions, or alterations may be made to the data structure shown in FIG. 2 without departing from the scope of the instant invention as recited in the claims appended hereto. More particularly, fields, rows, or columns made be added, modified, reconfigured, or deleted from the data structure as shown in FIG. 2 without departing from the scope of the instant invention.

Hardware components suitable for practicing, at least in part, the conference call enrollment process 105 and the conference call admission process 405 discussed below can include general-purpose voice response units (VRUs) or interactive voice response (IVR) units configured as taught herein to receive and connect the conference call host 100 to a conference call in response to recognizing a unique identifier (via e.g., ANI or DNIS) associated with the conference call host 100. Other suitable hardware components that may be configured as discussed above can include computer- or processor-based servers that facilitate directly connecting the conference call host 100 to a conference call along with any supporting software. One or more data stores 110 populated with data as discussed herein can also support these various hardware or software components.

The goal of these various configuration processes is to enable these various component(s) to support directly connecting the conference call host 100 to a conference call, which can be either an existing conference call or a new conference call created in response to receiving a communication from the conference call host. The term "directly connecting" as used in the instant detailed description can refer to connecting a conference call host 100 to a given conference call without input or entry of any additional data from the conference call host 100 aside from dialing the assigned telephone number to access conferencing services or initiating a communication to access conferencing services. Also, the term "directly connecting" can refer to connecting the conference call host 100 to the conference call while bypassing manual or vocal entry of conference host pass codes, or of other DTMF data or other data, as input by the conference call host 100. According to the instant invention, any additional information necessary to admit the host 100 to conference calls is extracted automatically without further action by the conference call host 100. Thus, the host 100 is relieved of the burden of memorizing passcodes or the like when requesting admission to a conference call. Also, the conference call host 100 need not refer to a card or other item, or have such card or other item accessible, when requesting a conference call. Instead, the data store 110 and related data structure shown in FIG. 2 stores any information that is pertinent to admitting the conference call host 100, and data obtained automatically from a communication from the conference call host 100 is used to extract this admission-related information from the data store 110 automatically without further action taken by the host 100.

In other embodiments of the invention, the host 100 can be a host 100 who has already enrolled in some type of conferencing services, but did not previously enroll for the "direct connection" feature described herein. Those skilled in the art will recognize that the conference call enrollment process 105 could support hosts 100 who are either first-time enrollees, or who are enrolled hosts 100 who subsequently re-enroll for additional services.

Admission of Conference Host into Conference Call

Various embodiments of the invention pertaining to admitting conference call hosts 100 directly to conference calls will now be discussed in connection with FIGS. 4-8.

FIG. 4 is a block diagram illustrating components and data flows associated with processing requests from enrolled conference hosts 100 to access conference calls according to the instant invention. These embodiments of the invention pertain to admitting conference call hosts 100 directly into conference calls.

In summary, a conference call admission process 405 receives a request 402 from a given conference call host 100 for access or admission to a given conference call, and receives data representing a unique identifier 103 provided by or otherwise associated with the communication from the conference call host 100 when requesting access to the conference call. The conference call admission process 405 then searches the data store 110 for an entry pertaining to the conference call host 100, using the unique identifier 103 as a search key or index field. Upon matching the unique identifier 103 with a record in the data store 110, the conference call admission process 405 proceeds to connect the conference call host 100 directly to a conference call using, at least in part, the data stored in this record. A conference call may include, e.g. the host 100 and the participants 404a and 404b. Two participants are shown in FIGS. 5 and 5 for convenience, but the instant invention can be used to support any number of participants, with the integer N shown in FIGS. 4 and 5 assuming any value greater than or equal to 1.

Figure 6:
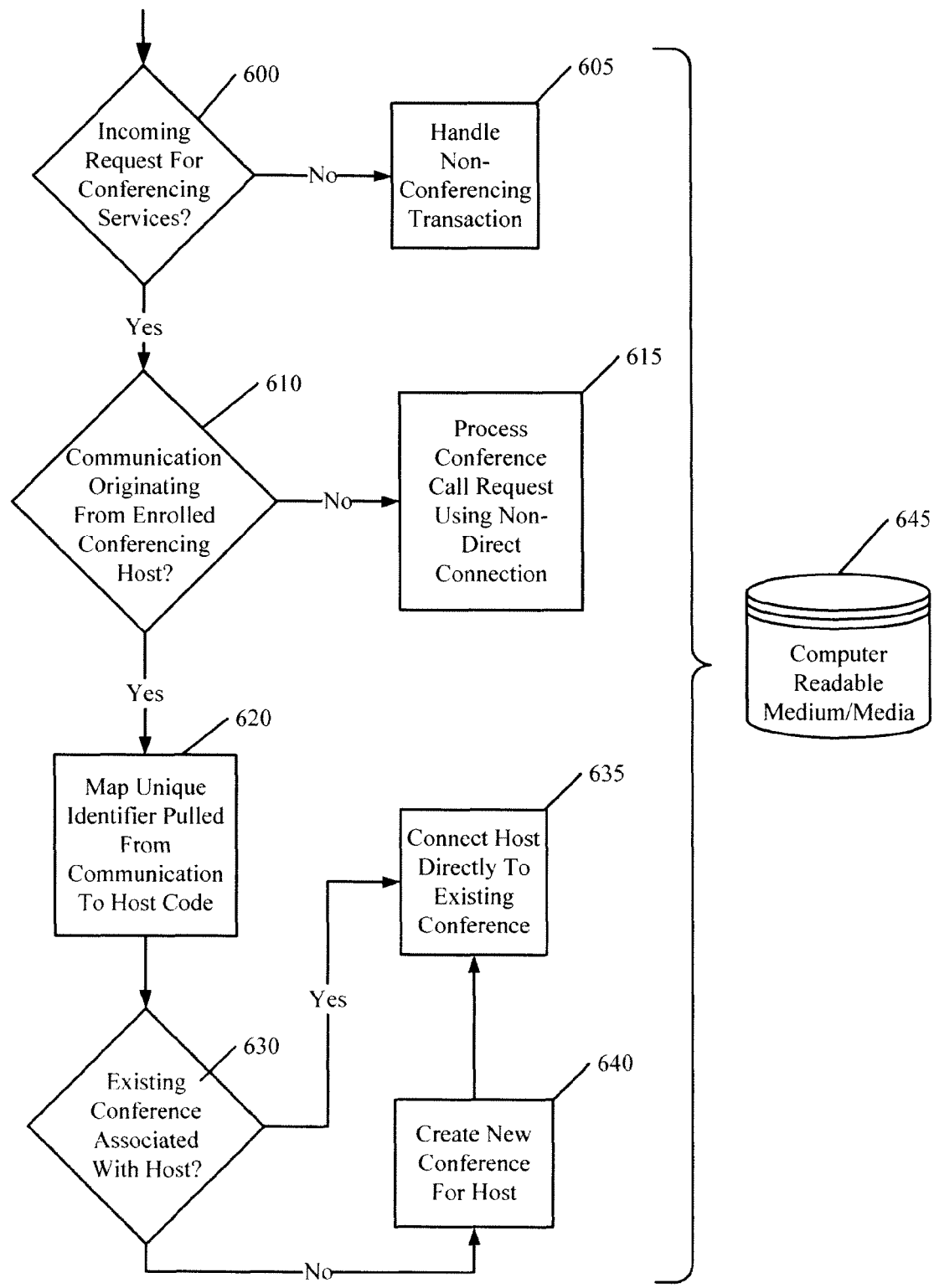
FIG. 6 is a flowchart illustrating process flow associated with the admission process.

Turning in more detail to FIGS. 4 and 6, the latter being a flowchart illustrating a process flow employed to admit hosts 100 directly to conference calls, the conference call admission process 405 enables the host 100 to access a conference and/or request direct and/or expedited admission or entry to a given conference call. Typically but not exclusively, the conference call admission process 405 receives a communication or request 402 originating from or initiated by the conference call host 100 that indicates that the given conference call host 100 is requesting admission to a conference call (decision block 600 in FIG. 6). If the incoming communication relates to conferencing services, processing proceeds to block 610 (discussed below). Otherwise, processing proceeds to block 605 to handle a requested transaction that is not conferencing-related and thus not dealt with by the instant invention. Thus, the method taught herein can enable hardware and/or software comprising e.g., a general-purpose, automated, interactive call processing platform to support simultaneously both a conferencing and non-conferencing applications, thereby achieving higher utilization of the platform and enabling the platform to support a greater variety of revenue-producing transactions. An illustrative example of a conference application is the conferencing method taught herein, and an illustrative example of a non-conferencing application might include an automated application enabling purchases of pre-paid phone cards to redeem the calling time associated therewith.

In illustrative but non-limiting embodiments of the instant invention, the request 402 can take the form of a telephone call received from the conference call host 100. Such a telephone call can be dialed to one, or one of a plurality of, pre-defined destination telephone numbers (either toll or toll-free, and either shared among several hosts 100 or unique to one host 100) that support conference calls. As discussed above, these destination telephone number(s) can be provided to conference call hosts 100 when they register, subscribe to, or enroll in conferencing services with a conference call enrollment process 105 (see, e.g., FIG. 1) provided according to the teachings herein. Those calls dialed to telephone numbers that are dedicated to or related to conferencing services are most likely calls from conferees or hosts 100 seeking access to conference calls. The conference call admission process 405 can examine data associated with these incoming telephone calls to determine the destination numbers to which the calls were dialed. The DNIS service referenced above may be suitable to serve this function, but other methods of performing this function may also be suitable. More generally, the conference call admission process 405 can analyze information related to the request 402 to extract access information 102 therefrom, and if the extracted access information 102 matches any access information 102 assigned to an enrolled conference call host 100, then the conference call admission process 405 knows that an enrolled conference call host 100 may be calling in.

The conference call admission process 405 can identify the caller as being not only a conference call host 100, but also a conference call host 100 who has enrolled for conferencing services according to the instant invention (decision block 610). If the incoming communication originates with an enrolled conference call host 100, then the process proceeds to block 620. Otherwise, the process proceeds to block 615, where the incoming conferencing request is handled using techniques other than the instant invention.

One illustrative way to identify the caller as an enrolled conference call host 100 is to receive and process data representing a unique identifier 103 associated with the communication originated by the caller. For example, this unique identifier 103 may indicate the originating telephone number of one or more handsets associated with a conference call host 100 (via, e.g., ANI), from which handsets the conference call host 100 may initiate requests 402 to access conference calls. Where the conference call host 100 is assigned a unique destination number for accessing conference calls, this destination number, when recognized in an incoming call via, e.g., DNIS, can identify a caller as an enrolled conference call host 100.

Turning briefly to a discussion of general operating environments, the conference call admission process 405 and the conference call enrollment process 105 as discussed herein can be implemented over known circuit-switched telecommunications networks, including at least in part the conventional Public Switched Telephone Network (PSTN), as that term is understood by those skilled in the art. Other embodiments of the instant invention can be implemented over packet-switched telecommunications networks, using, e.g., Voice over IP (VoIP). In these packet-switched embodiments, the unique identifier 103 associated with the conference call host 100 and received from communications therewith can include a signal representing an IP address (or other types of addresses relevant to packet-switching) from which the conference call host 100 originates a communication. Other aspects of these packet-switched embodiments can include receiving and processing any other unique identifier 103 associated with, for example, a network device from which the conference call host 100 originates a communication.

Returning to FIGS. 4 and 6, the unique identifier 103, however obtained and in whatever form, can at least partially identify the caller who initiated the communication, assuming that the unique identifier 103 (e.g., a network address, physical address, telephone number) can be mapped to an entry in a data store containing this information (e.g., a data store 110). Having obtained this unique identifier 103 from the communication, the conference call admission process 405 determines whether a registered conference host 100 is associated with that unique identifier 103 by searching the data store 110 using the unique identifier 103 as a key or index field. For example, referring back to FIG. 2, the conference call admission process 405 can traverse column 225 (in which the unique identifiers 103 for the various hosts 100 where stored by the conference call enrollment process 105) until it locates an entry matching the unique identifier 103 obtained from the communication 402.

If the data store 110 contains a match for the unique identifier 103, it returns a signal 406 to the conference call admission process 405 indicating a "hit", and the process shown in FIG. 6 takes the "yes" link from the decision block 610 to the block 620. The "row" in the data store 110 that contains the matching unique identifier 103 thus represents the record storing data specific to the given conference call host 100 who is calling-in with the request 402. The data store 110 can then retrieve any data contained in the "row" containing the matched unique identifier 103, and return it upon request to the conference call admission process 405. This data can include at least a host code or host passcode associated with the conference call host 100.

More particularly, if the conference call admission process 405 determines through, e.g., ANI that an incoming call was dialed from a device or location associated with a telephone number X, it will attempt to locate a record in the data store 110 indicating that an enrolled conference call host 100 is associated with that telephone number X. The enrolled host would have provided that number X as a unique identifier 103, that is, as a number from which that conference host 100 may initiate a request 402 for conferencing services. In this manner, the conference call admission process 405 can map a unique identifier 103 pulled from the incoming communication to other information specific to the conference call host 100 (block 620 in FIG. 6). In any event, the conference call admission process 405 can use this procedure to obtain data automatically that would otherwise have to be entered or otherwise manually or verbally provided by the host 100.

Conversely, if the data store 110 does not contain the unique identifier 103, the data store 110 returns an appropriate signal 406 to the conference call admission process 405 indicating a "miss". In this event, the process shown in FIG. 6 would proceed (from decision block 610) to block 615, where the host 100 is connected or admitted to the conference using means and methods other than those taught herein.

Applying this matching procedure to VoIP embodiments, a unique identifier 103 adapted for use with packet-switched networks can be compared with entries in the data store 110 that contain addresses or other unique identifiers previously stored when conference call hosts 100 were enrolled. These unique identifiers 103 can be chosen for or relevant to use in IP-based or other packet-switched environments. Additionally, this IP-related, unique identifier 103 can be compared with one or more previously-designated IP addresses or other unique identifiers 103 associated with a previously-designated network device from which a conference call host 100 may originate communications.

In either the packet-switched or circuit-switched embodiments discussed herein, the relevant unique identifiers 103 that are obtained, compared, and matched can be unique identifiers 103 derived from or otherwise associated with either wired or wireless communications devices or communications.

Assuming that a match for the unique identifier 103 is found in the data store 110, then the conference call admission process 405 connects the conference call host 100 directly to a conference call. This conference call can be either an existing conference call or a new conference call created in response to the request 402 from the conference call host 100. In decision block 630, the conference call admission process 405 determines whether an existing conference is associated with a host code, host passcode, or other host-specific conference identifiers obtained from, e.g., record contained in the data store 110 based on the unique identifier 103. For example, conference participants 404a and/or 404b, as distinguished from the conference call host 100, may call in to the conference call admission process 405 to access a given conference before the conference call host 100 does so. The participants 404a and/or 404b may provide a participant code, which is marked by the conference call admission process 405 to the conference call host 100 who provided the participant code to the participants 404a and 404b. Should the participants 404a and/or 404b call in before the conference call host 100 does, the process 405 can either: place the participants 404a and/or 404*b* on hold; conference them together with limited privileges and functions available until the conference call host 100 calls in; conference them together with full privileges and functions, with the conference call host 100 calling in later; or handle the early-arriving participants 404*a* and/or 404*b* in other ways.

In block 630, if participants associated with the conference call host 100 have already called in when the conference call host 100 calls in, then an existing conference may be in progress, and in block 635, the process 405 directly connects the conference call host 100 to this existing conference. Otherwise, if no participants 404*a* and/or 404*b* associated with the conference call host 100 have already called in, the process 405 creates a new conference (block 640), and then proceeds to connect the conference call host 100 directly to the newly-formed conference (block 635).

The terms "directly connect", "direct entry", or "expedited entry" has the same meaning as set forth above in connection with the conference call enrollment process 105. Referring to FIG. 2, one illustrative but non-limiting method for facilitating this direct or expedited connection or entry to the conference call can include retrieving parameters such as the conference host code 210 for the given conference call host 100, and forwarding it to the conference call admission process 405 so that the conference call host 100 can be admitted using this parameter. Thus, the conference call host 100 is relieved of the burden of memorizing, storing, or otherwise keeping track of information such as the conference host code. Instead, this information is extracted automatically from the communications of the conference call host 100, such as a unique identifier 103 in the form of an ANI parameter pulled from the host's incoming call. This automatically extracted information serves as a means for retrieving previously stored information that is necessary or required to admit the conference call host 100 to the conference call. Accordingly, to request a conference call, the conference call host 100 need do nothing except dial the telephone or other access number.

FIG. 5 is a block diagram of a more specific form of the embodiment shown in FIG. 4. Thus, the general unique identifier 103 is replaced by specific ANI/DNIS information 103*a*, and the conference call host 100 is associated with one or more respective telephone numbers, which are designated collectively at 500. These numbers 500 could represent either access information 102 in the form of destination telephone numbers that the conference call host 100 could dial to request a conference call, or unique identifiers 103 in the form of identifiers corresponding to one or more handsets or locations from which the conference call host 100 may originate such requests.

Generalizing the foregoing discussion, the concepts discussed above in connection with enrolling and admitting conference call hosts can also be extended to provide expedited admission of conference call participants, or more generally still, any conferee. A "conferee" is a person who participates in a given conference call, and can be either a "host" or a "participant". The "host" of the given conference call is the conferee who actually enrolled for conferencing services and who assumes primary financial responsibility for the given conference call, as distinguished from a "participant", as defined below. Some conference calls, referred to as "hostless" conference calls, may not have a host associated therewith; instead, each conferee pays his or her own charges for participating in the given conference call. A "participant" in a given hosted conference call refers to all conferees in that call other than the host. The above discussion related to expedited or direct admission of conference hosts can also be extended to admission of conferees generally, or participants, as well as hosts. As a non-limiting example, a given conference call host may define a "buddy list", comprising data representing one or more participants that are associated with the host. Those participants on the host's buddy list can then use the enrollment features taught herein to obtain expedited or direct entry to a conference call associated with the host.

As used herein, the term "conference call" refers to a conversation between two or more persons conducted by coupling those persons to communicate by voice indirectly using an intermediate, dedicated device connected to communicate with those persons, such as, for example, a bridge, a voice response unit, or a mixer, as distinguished from conducting a direct, point-to-point connection made between each of the persons. Other hardware suitable for performing the connection and communications functions described herein can include, at least in part, private branch exchange (PBX) systems, media servers, media gateways, switches, or the like.

Generalizing the types of unique identifiers discussed above, these unique identifiers can take the form of biometric data, such as voiceprints obtained at enrollment time and compared to voice prints obtained from conferees requesting direct admission to a given conference call. In voice print embodiments, a speech recognition engine may be useful to process and/or analyze the voiceprints, and can operate in connection with speech-to-text engines to convert the speech input to corresponding text. This function may be useful not only for identifying the conferee based on voice analysis, but also for populating a data structure supporting a text-based presentation or roster of conferees attending a given conference call. Other forms of biometric identification can include retina or iris recognition, facial analysis, thumb or fingerprint analysis, or the like.

In further aspects of the invention, the unique identifier can be related to the means by which the conferee accesses conferencing services. In these aspects of the invention, the unique identifier can take forms such as an e-mail address, a Universal Resource Locator (URL), a browser cookie stored on the conferee's computer, an IP address or an SIP address, or the like. These aspects of the unique identifier may find particular application in those embodiments wherein a conferee enrolls for or accesses conferencing services via a personal computer, WiFi-based device, wireless-enabled personal digital assistant (PDA), handheld computer, mobile phone, devices based on packet-switching technology, or the like.

Figure 7:
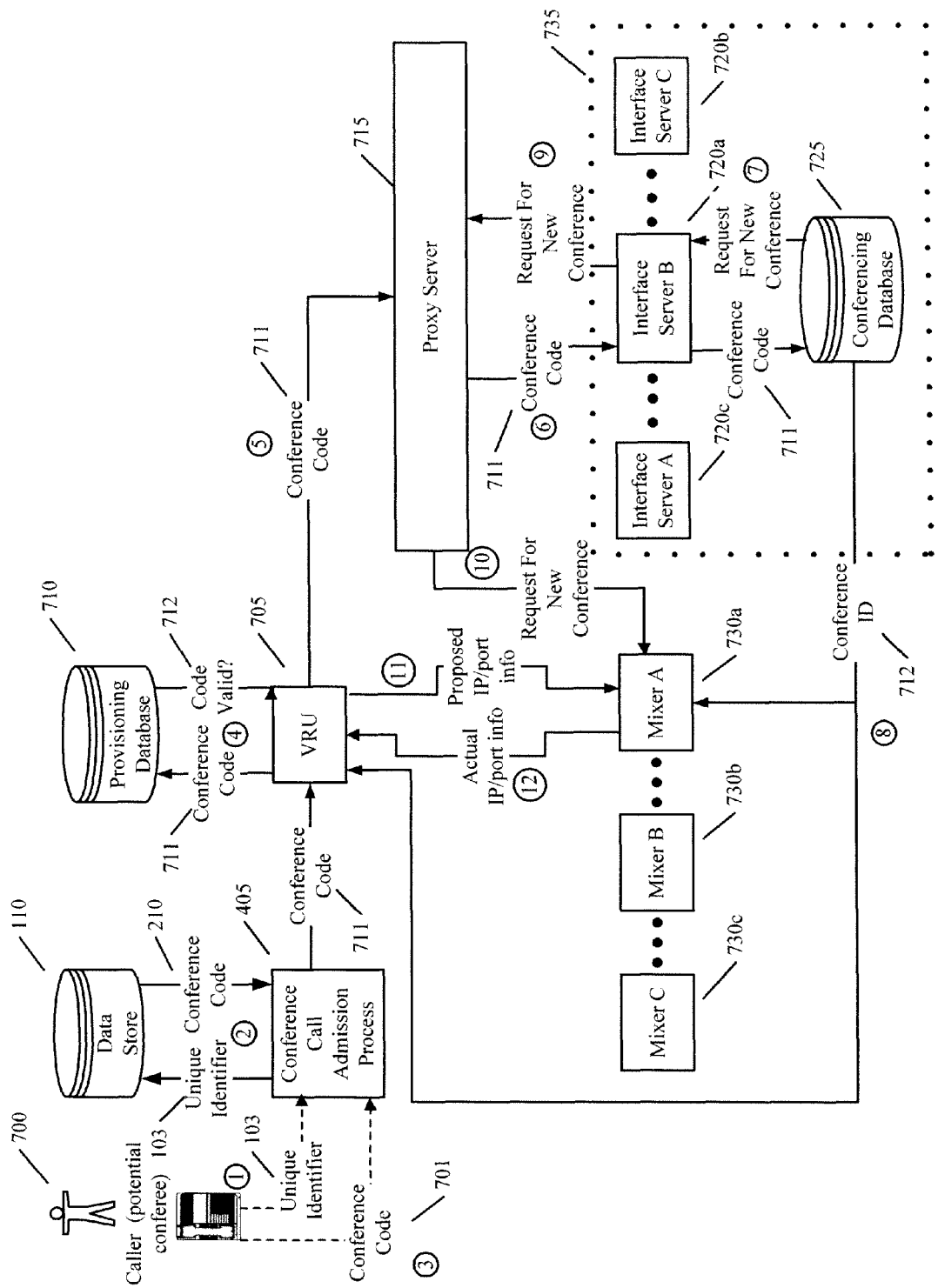
FIG. 7 is a block diagram illustrating in more detail components and data flows pertaining to admitting conference hosts to conference calls, with the invention discussed in connection with FIGS. 1-6 serving a pre-processing function.
Figure 8:
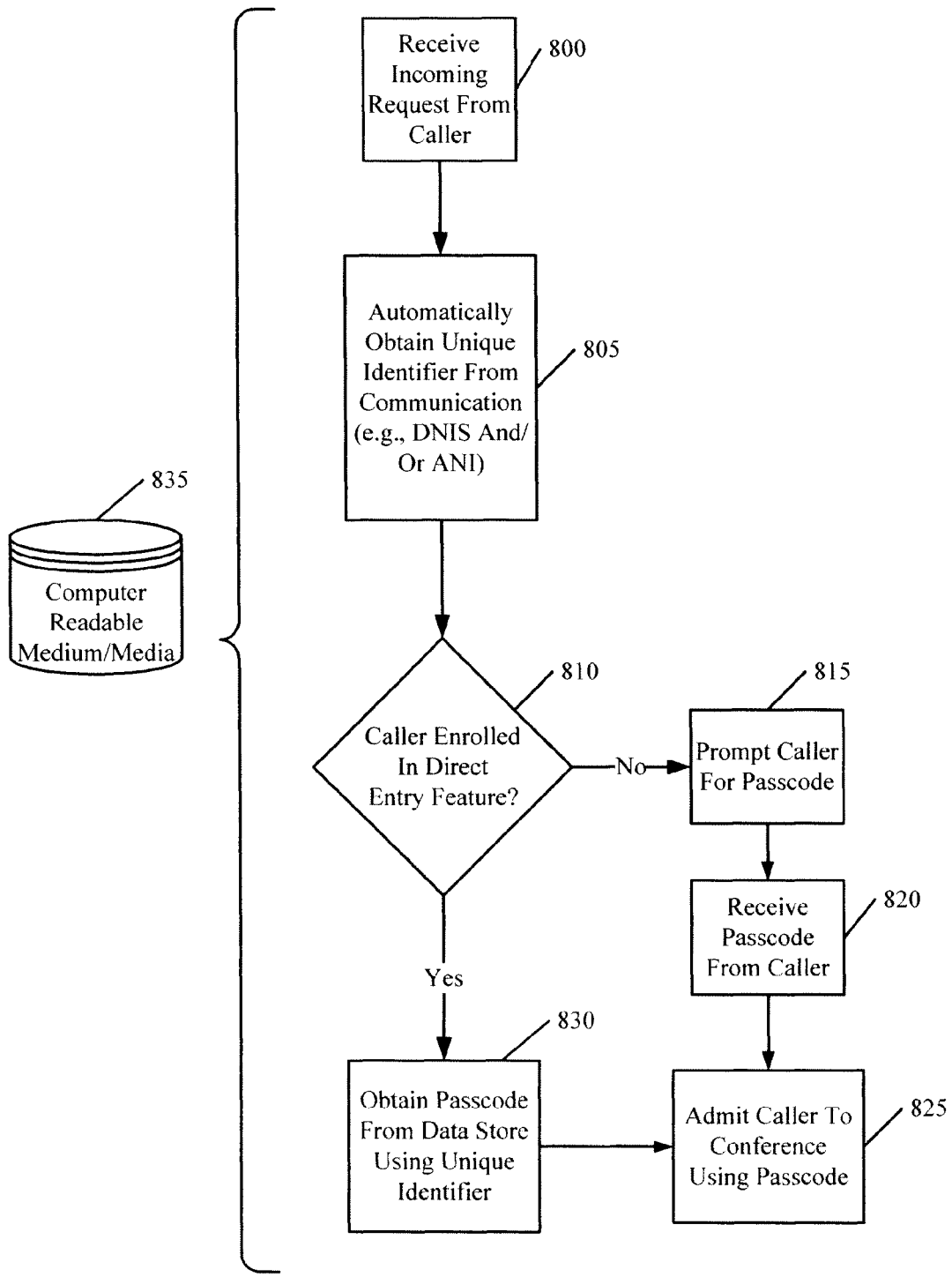
FIG. 8 is a flowchart illustrating process flow similar to that shown in FIG. 6, but more particularly adapted to support the components and data flows shown in FIG. 7.

FIG. 7 is a block diagram illustrating components and data flows associated with integrating the conference call admission process 405, as taught above, into a representative overall conference call flow. FIG. 8 is a flowchart of process flow by which the conference call admission process 405 and related data store 110 perform preliminary processing to support the rest of the components and data flows shown in FIG. 7.

Some of the data flows shown in FIG. 7 can be accomplished using messages passed between the various components via a proxy server 115. However, to promote clarity and conciseness, and to avoid overcrowding in FIG. 7, some of these data flows are shown as bypassing the proxy server 115, when some of these flows may indeed pass through the proxy server 115. Thus, the data flows appearing in FIG. 7 (and all other drawings herein) are chosen for expository convenience only, and do not limit the instant invention.

To facilitate understanding of an illustrative but non-limiting sequence of processing shown in FIG. 7, sequence numbers appear in FIG. 7 inside circles, and these sequence numbers correspond to the paragraph numbers herein.

1. Turning to FIGS. 7 and 8, a caller 700 uses the access information 102 (FIG. 1) to request a conference call (402 in FIG. 4), and this incoming communication can be processed by the conference call admission process 405 using the process flows shown in FIGS. 7 and 8. The conference call admission process 405 can be realized as a function hosted within or aboard the VRU 705, or can be realized on a component other than the VRU 705. In any event, the incoming request 402 from the caller 700 can be received at least preliminarily on either the VRU 705 or on another component hosting at least the functions illustrated in FIG. 8.

In block 800, the incoming request 402 from the caller 700 is received and processed by the conference call admission process 405. In block 805, the process 405 automatically obtains one or more unique identifiers 103 related to the incoming communication. Illustrative suitable unique identifiers 103 can include, but are not limited to, parameters such as ANI or DNIS. At decision block 810, the process 405 determines whether the incoming caller 700 is a conference call host 100 enrolled for the direct entry feature as taught herein. The functions represented in block 810 can be implemented similarly to those represented in block 610 in FIG. 6, using, e.g., at least the unique identifier(s) 103.

2. If the caller 700 is an enrolled conference call host 100, processing proceeds to block 830, where the process 405 obtains a passcode 210 or other host-specific conference code, based at least in part on the unique identifier 103. The function of block 830 can be implemented similarly to that of block 620 in FIG. 6, as discussed in connection with the illustrative data structure shown in FIG. 2. The term "passcode" or "conference code" 210 refers to any unique identifier associated with the conference call host 100 to identify conferences associated with a given conference call host 100 to the exclusion of conferences associated with all other conference call hosts 100. Having obtained the passcode/conference code 210 or other host-specific conference code, this code 210 can be forwarded to the VRU 705 for further processing as discussed below.

3. If the caller 700 is not an conference call host 100 enrolled for the direct entry feature described herein, processing proceeds to block 815, where the caller 700 is prompted to enter a conference code 701 (e.g., manually or verbally through a communications device), and in block 820, the conference code 701 is received from the caller 700. More generally, the VRU 705 can prompt the caller 700 to enter a passcode, a conference code, or other conference configuration information. Typically, the caller 700 will respond to these prompts by keying in the requested data via DTMF input or by speaking the requested codes. In the latter case, a speech recognition engine (readily available from a variety of vendors) may be deployed to process speech input from the caller 700. In block 825, the caller 700 is admitted to the conference call using the illustrative but non-limiting process flow described below. The flow shown in FIG. 8 can reach block 825 from either block 820, wherein the conference call host 100 provides a passcode 701 verbally or manually; or from block 830, wherein the passcode 210 is obtained automatically using only data that is intrinsic to the incoming communication, without further manual or verbal input from the caller 700. Thus, the conference code 711 shown in FIG. 7 represents either the conference code 210 as obtained automatically using the unique identifier 103 or the conference code 701 as provided directly by the caller 700.

4. Illustrative but non-limiting examples of the processing represented generally in block 825 are now discussed. The VRU 705 can forward the conference code 711 to a provisioning database 710 for validity checking, if appropriate. For example, only the conference code 701 provided by the caller 700 may need validation; the conference code 210 obtained automatically from the data store 110 may not necessarily need validation. The provisioning database 710 can be populated when conference hosts 100 enroll for conferencing services. The provisioning database 710 responds to the VRU 705 with a signal 712 indicating the validity or invalidity of the conference code 711 submitted by the VRU 705. If the conference code 711 submitted by the VRU 705 is invalid, the VRU 705 can reprompt the caller 700 to reenter the conference code 711 (not shown explicitly in FIG. 7), and can repeat this process for a reasonable number of times. If the caller 700 responds with a conference code 711, that code can pass directly to the VRU 705, or can pass through any number of intermediate components between the VRU 705 and the caller 700. However, if the caller 700 fails to enter a valid conference code 711 within this time frame, the interaction between the VRU 705 and the caller 700 will be terminated, or the caller 700 will be forwarded to a live human operator for resolution.

5. If the conference code 711 submitted by the VRU 705 is valid, the VRU 705 passes a message referencing the conference code 711 to a proxy server 715 requesting that the caller 700 be added to a conference. Those skilled in the art can construct the proxy server 715 to realize the functions described herein using, for example, a general-purpose personal computer (PC) running, e.g., an operating system such as any of the Windows™ family of operating systems, Linux™, or Unix™, or the like. The proxy server 715 can also run application software, including at least software relating to supporting Session Initiated Protocol (SIP)-based conferencing and/or telephony. Software suitable for these purposes is commercially available from, e.g., Vail Systems, Inc. The proxy server 715 maintains a list of all active interface servers 720a, 720b, and 720c (referenced collectively as interface server 720), and also tracks the loads currently being supported by each interface server 720. The interface servers 720 function at least in part to support pipes or queues that contain requests to be acted upon by a conferencing database 725. These pipes or queues can assume any type known to those skilled in the art, including but not limited to FIFO, LIFO, or other types. The interface servers 720 can be implemented to realize the functions described herein using general-purpose server hardware available from a variety of vendors. The proxy server 715 keeps running counts of pending message requests pending or awaiting on each interface server 720. With this data, the proxy server 715 can perform load balancing across each of the various interface servers 720. The conferencing database 725 can then select requests from various ones of the queues supported by the various interface servers 720 for action. The results of such action can be posted or stored in a results queue or other data structure.

6. The proxy server 715 determines that the message referencing the conference code 711 incoming from the VRU 705 should be processed by the conferencing system 735, which comprises at least the interface servers 720 and the conferencing database 725. The conferencing database 725 tracks state or status data for each conference currently active at any given time. Illustrative but non-limiting examples of the types of data generated or tracked by the conferencing database 725 can include, but are not limited to: a unique identifier associated with each conference, identifying each conference to the exclusion of all others; a lecture-only flag as applicable to each conference; a record flag indicating whether the conference is to be or is being recorded; a unique identifier indicating the mixer 730 assigned to support each conference; one or more conference keys associated with hosts 100 or participants 404*a* or 404*b* engaged in various conferences. For each conference supported by the conferencing database 725, as the status of each conference changes, the conference database 725 tracks each change in status in a state table or other suitable data structure.

The proxy server 715 selects an available interface server 720 (either 720*a*, 720*b*, or 720*c*), and forwards the incoming message referencing the conference code 711 to the selected interface server 720*a*. FIG. 7 shows three interface servers 720*a*, 720*b*, and 720*c* for convenience in illustrating the concepts of load balancing and redundancy. However, this arrangement is not mandatory or critical to the instant invention, and various embodiments of the invention may deploy one or more interface servers 720, depending on the requirements and circumstances of a given application of the instant invention.

The proxy server 715 maintains an active list of each current SIP-enabled device currently operative within the system shown in FIG. 7. Each SIP-enabled device is required to register with the proxy server 715 upon start-up, and to provide thereafter "heartbeat" messages periodically (e.g., once every "x" seconds) to the proxy server 715. In this manner, the proxy server 715 can determine which SIP devices are currently up and running, and further knows the current status of each SIP device. If the proxy server 715 does not receive a "heartbeat" message from a given SIP device after expiration of a pre-determined time interval (e.g., once every "x" seconds), thus indicates to the proxy server 715 that the given SIP device may be inoperative. The proxy server 715 can then route future requests or commands to SIP devices that function as back-up devices to the apparently inoperative SIP device.

7. The conferencing system 735 then determines if a conference associated with the input conference code 711 already exists. If not, the conferencing system 735 will request that a new conference be created, and the conference database 725 will generate a new unique conference identifier 712 for the new conference. The conferencing system 735 will then associate the newly generated conference identifier 712 with the conference code 711 input by the VRU 705.

8. The new unique conference identifier 712 can be forwarded to the VRU 705 and/or to the mixer (730*a*, 730*b*, or 730*c*) that is selected (discussed below) to host the new conference. The VRU 705 can then associate all future callers 700 who provide the given conference code 711 with the new unique conference identifier 712 and can thus connect these future callers to the appropriate mixer that is hosting the conference sought by such future callers.

9. Via a new-conference-request message or other suitable mechanism, the conferencing system 735 requests that the proxy server 715 select a mixer 730 (from among e.g., the mixers 730*a*, 730*b*, or 730*c*) to host the new conference, which is associated with the newly created unique conference identifier 712. If necessary, the conferencing database 725 can stall the VRU 705 with a temporary acknowledgement command or other similar messaging mechanism (not shown in FIG. 7) in order to "buy" more time to respond to the VRU's original request, i.e., to add the caller 700 to a conference.

10. The proxy server 715 selects one of the mixers 730*a*, 730*b*, or 730*c* to host the new conference. This selection can be made based upon present mixer load and/or capacity (determined using any suitable algorithm), mixer calls, or other applicable criteria. The mixers 730 can be implemented using, e.g., a general-purpose server or computer including one or more microprocessors and any hardware necessary to support VoIP communications (e.g., one or more specialized voice-processing boards such as those commercially available from Dialogic, a subsidiary of Intel Corporation), running a suitable operating system (e.g., Unix™, Linux™, any of the Windows™ family, or the like), and running suitable application software, including at least conference mixing software available from Vail Systems, Inc., as referenced above. The proxy server 715 forwards the "new conference" request to the selected mixer, e.g., mixer 730*a*. The proxy server 715 maintains data indicating the current status of each of the mixers 730*a*, 730*b*, and 730*c* (collectively 730), as discussed above with other SIP devices. Maintaining status in this manner allows the proxy server 715 to perform load balancing among the various mixers 730, similar to the load balancing described above in connection with the interface servers 720, and also prevents the proxy server 715 from sending conference requests to a "dead" mixer 730.

The same comments above directed to the illustrative number of interface servers 720 apply equally to the number of mixers 730 shown in FIG. 7.

If the selected mixer 730*a* can create the new conference, it does so and returns an acknowledgement message (not shown) to the conferencing database 725 via the proxy server 715. Otherwise if the selected mixer 730*a* cannot create the new conference, it returns a negative acknowledgement to the conferencing database 725 via the proxy server 715. In the latter instance, the proxy server 715 would then select a different mixer (e.g., mixer 730*b* or 730*c*) to host the new conference. In any event, once a suitable mixer 730 is located to host the new conference, the conferencing database 725 is updated to show that the new conference is now assigned to the selected mixer 730*a*. A unique identifier corresponding to the selected mixer 730*a* is stored with the conference code 711 and/or the conference identifier 712, thereby associating the conference with the mixer 730*a*. The conferencing database 725 can then provide the unique conference identifier 712 to the selected mixer 730*a* and to the VRU 705, and also instructs the VRU 705 to connect the caller 700 to the selected mixer 730*a*.

11. In response to the command from the conferencing database 725 to connect the caller 700 to the selected mixer 730*a*, the VRU 705 sends a proposed set of IP/port data to the selected mixer 730*a* (via the proxy server 715) for routing the conference stream data (the data representing the verbal or other interactions exchanged between conferees) between the VRU 705 and the selected mixer 730*a*. The VRU 705 also indicates whether the caller 700 is a conference host 100. In some embodiments of the instant invention, the conference will not actually begin until the host 100 associated with the conference code 711 provided by the VRU 705 has dialed into the conference. Until that happens, the various participants (e.g., 404*a* or 404*b*) calling into the conference may be put on hold, but not actually bridged together into a conference until the host calls in.

12. The selected mixer 730*a* responds to the VRU 705 with the actual IP/port information that will be used for passing conferencing-related media between the mixer 730*a* and the VRU 705 for communication with the caller 700. The mixer 730*a* also provides the VRU 705 with information relating to any media descriptions or codecs that the VRU 705 may need to process the conferencing stream as passed between the caller 700 and the selected mixer 73b0a, via the VRU 705. Upon receiving this response from the selected mixer 730a, the VRU 705 configures itself to receive the conferencing stream, e.g., by activating its RTP stream, and the caller 700 is now in the conference. "RTP" stands for real time transport protocol, which is an IETF standard for streaming real time multimedia over an IP network in packets. At this point, the VRU 705 and the selected mixer 730a are now connected via a local area network. Thus, each caller 700 that calls into a conference may reach the VRU 705 via a circuit-switched network (not shown), but the link between the VRU 705 and the selected mixer 730 can be via a packet-switched (e.g., VoIP) network. The participants, 404a and 404b, and the host 100 can dial-in to a conference via different ports on the VRU 705, or even via different VRUs 705 altogether, but will all be linked to a given mixer 730, e.g., mixer 730a.

The conferencing database 725 is updated to show that the VRU 705 and the caller 700 are in the conference, and the status of each of the various devices discussed herein, as well as the overall status of the conference itself, are updated with the conferencing database 725 periodically.

Caller into Existing Conference

If the caller 700 is dialing into an already-existing conference, the same method as discussed above is performed, up to paragraph 6, where the conferencing database 725 checks for an existing conference associated with the input conference code 711. If the conferencing database 725 locates an existing conference identifier 712 corresponding to the conference code 711 submitted by the VRU 705, the conference database 725 knows that the conference sought by the caller 700 currently exists. In this case, the conferencing database 725 then forwards to the VRU 705 the identifier of the mixer 730a that is hosting the existing conference. The VRU 705 then sends an "invite" message to the selected mixer 730a. The selected mixer 730a responds with the IP/port data that the mixer 730a will use for transmitting the conference stream media to the caller 700 via the VRU 705. The VRU 705 then activates its RTP stream and the caller 700 is now in the conference. The conferencing database 725 is updated accordingly to reflect that the caller 700 is in the conference.

Computer-Readable Medium/Media Embodiments

A suitable application program can implement software residing on the computer-readable medium or media 340, 645, or 835 and embodying the various aspects of the method discussed herein and shown in the drawing figures, and can be coded using any suitable programming or scripting language. However, it is to be understood that the invention as described herein is not dependent on any particular operating system, environment, or programming language. Illustrative operating systems include without limitation LINUX™ UNIX™, or any of the Windows™ family of operating systems, and illustrative languages include without limitation a variety of structured and object-oriented languages such as C, C++, Visual Basic, or the like, including those programming or other configuration methodologies applicable to VRUs/IVRs.

As those skilled in the art will understand, the program of instructions can be loaded and stored onto a program storage medium/media 340, 645, or 835 readable by a computer or other machine, embodying a program of instructions executable by the machine to perform the various aspects of the invention as discussed and claimed herein, and as illustrated in the drawing figures. Generally speaking, the program storage medium/media 340, 645, or 835 can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage medium/media 340, 645, or 835 can be affixed permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figures attached hereto.

Those skilled in the art, when reading this description, will understand that unless expressly stated to the contrary, the use of the singular or the plural number herein is illustrative, rather than limiting, of the instant invention. Accordingly, where a given term is discussed in the singular number, it will be well understood that the invention also contemplates a plural number of the item corresponding to the given term and vice versa, unless expressly stated herein to the contrary.

Those skilled in the art will further recognize that for the purposes of expository convenience, legibility, and clarity, various data stores or databases 110, 710, and 725 are shown separately, and they are discussed separately herein. However, the embodiments shown herein are illustrative rather than limiting, and that some or all of these various data stores could readily be combined or consolidated into one or more data stores without departing from the scope of the invention.

The term "data store" herein refers to any storage medium capable of storing data, whether realized using semiconductor, magnetic, or optical technology. This term can also include abstract data structures supported by any number of programming languages, with non-limiting examples including queues, stacks, linked lists or the like, all of which are implemented at the machine level by disk storage, semiconductor memory, optical media, or the like. If the data store 108 is implemented as a database, this database can take the form of a relational database, an object-oriented database, and any combination thereof, or any other known database technology. Suitable database server programs are readily available from a variety of vendors, including IBM/Informix, Microsoft, Oracle, or the like.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

We claim:

1. A system, comprising:
a server operable to receive an admission request from a communications device, the admission request including a unique identifier, and create a conference call in response to the admission request;
a data store including previously stored data unique to the communications device; and
wherein the server is further operable to connect the communications device to the conference call when the unique identifier and the previously stored data match which includes a bypass of an entry of at least one conference pass code, store the unique identifier in the data store for future reference to identify conference calls including at least one of an origination from the communications device and associated with the communications device, wherein the unique identifier comprises a unique destination telephone number used to receive the admission request and wherein additional information associated with at least one of the communications device and a user of the communications device is not examined and the conference call is originated without prearrangement with a service provider.

2. The system as claimed in claim 1, wherein the communications device comprises one of a telephone, a personal computer, a WiFi-based device, a personal digital assistant (PDA), and a handheld computer.

3. The system as claimed in claim 1, wherein the data store comprises one of a magnetic hard drive, a floppy disk, an optical drive, and a CD-ROM.

4. The system as claimed in claim 1, wherein the server includes one of voice response units and interactive voice response units.

5. The system as claimed in claim 1, wherein communications between the communications device, the data store, and the server are transmitted and received via one of a circuit-switched telecommunications network and a packet-switched telecommunications network.

6. The system as claimed in claim 1, wherein the unique identifier additionally comprises one of a telephone number of the communications device, a telephone number assigned to the user, a mobile identification number, biometric data, an e-mail address, a Universe Resource Locator (URL), a browser cookie, an Internet Protocol (IP) address, and a Session Initiation Protocol (SIP) address.

7. A method, comprising:
receiving an admission request at a server from a communications device, the admission request including a unique identifier;
creating a conference call in response to the admission request;
storing data unique to the communications device in a data store;
comparing the unique identifier with the data unique to the communications device; and
when the unique identifier and the previously stored data match, connecting the communications device to the conference call which includes bypassing entry of at least one conference pass code, and storing the unique identifier in the data store for future reference to identify incoming conference calls including at least one of originating from the communications device and associated with the communications device wherein the unique identifier comprises a unique destination telephone number used to receive the admission request and wherein additional information associated with at least one of the communications device and a user of the communications device is not examined and the conference call is originated without prearrangement with a service provider.

8. The method as claimed in claim 7, wherein the server includes one of voice response units and interactive voice response units.

9. The method as claimed in claim 7, wherein the communications device is a telephone with one of a wired connection and wireless connection.

10. The method as claimed in claim 7, wherein the user of the communications device arranges for at least one of receiving admission to existing conference calls and starting new conference calls in a contractual arrangement with a provider of conference calling services.

11. The method as claimed in claim 7, wherein one of a telephone number of the communications device, a telephone number assigned to the user, a mobile identification number, biometric data, an e-mail address, a Universe Resource Locator (URL), a browser cookie, an Internet Protocol (IP) address, and a Session Initiation Protocol (SIP) address is alternatively transmitted from the communications device to the server as the unique identifier.

12. The method as claimed in claim 7, further comprising providing access information for accessing the conference call from the server to the communications device.

13. The method as claimed in claim 12, wherein the unique identifier comprises the access information.

14. A non-transitory computer readable storage medium comprising instructions that, when executed by a processor, perform:
receiving an admission request at a server from a communications device, the admission request including a unique identifier;
creating a conference call in response to the admission request;
storing data unique to the communications device in a data store;
comparing the unique identifier with the data unique to the communications device; and
when the unique identifier and the previously stored data match, connecting the communications device to the conference call which includes bypassing entry of at least one conference pass code, and storing the unique identifier in the data store for future reference to identify incoming conference calls including at least one of originating from the communications device and associated with the communications device wherein the unique identifier comprises a unique destination telephone number used to receive the admission request and wherein additional information associated with at least one of the communications device and a user of the communications device is not examined and the conference call is originated without prearrangement with a service provider.

15. The non-transitory computer readable medium as claimed in claim 14, wherein the communications device is a telephone with one of a wired connection and wireless connection.

16. The non-transitory computer readable medium as claimed in claim 14, wherein the communications device comprises one of a telephone, a personal computer, a WiFi-based device, a personal digital assistant (PDA), and a handheld computer.

17. The non-transitory computer readable medium as claimed in claim 14, wherein the user of the communications device arranges for at least one of receiving admission to existing conference calls and starting new conference calls in a contractual arrangement with a provider of conference calling services.

18. The non-transitory computer readable medium as claimed in claim 14, wherein one of a telephone number of the communications device, a telephone number assigned to the user, a mobile identification number, biometric data, an e-mail address, a Universe Resource Locator (URL), a browser cookie, an Internet Protocol (IP) address, and a Session Initiation Protocol (SIP) address is alternatively transmitted from the communications device to the server as the unique identifier.

19. The non-transitory computer readable medium as claimed in claim 14, further comprising instructions for providing access information for accessing the conference call from the server to the communications device.

20. The non-transitory computer readable medium as claimed in claim 19, wherein the unique identifier comprises the access information.

* * * * *